(12) United States Patent
Hernandez

(10) Patent No.: US 12,088,761 B2
(45) Date of Patent: *Sep. 10, 2024

(54) VOICE AND SPEECH RECOGNITION FOR CALL CENTER FEEDBACK AND QUALITY ASSURANCE

(71) Applicant: STATE FARM MUTUAL AUTOMOBILE INSURANCE COMPANY, Bloomington, IL (US)

(72) Inventor: Sylvia Hernandez, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/203,094

(22) Filed: May 30, 2023

(65) Prior Publication Data

US 2023/0300247 A1  Sep. 21, 2023

Related U.S. Application Data

(63) Continuation of application No. 17/472,557, filed on Sep. 10, 2021, now Pat. No. 11,706,338, which is a
(Continued)

(51) Int. Cl.
*H04M 3/51* (2006.01)
*G06F 40/205* (2020.01)
(Continued)

(52) U.S. Cl.
CPC ........ *H04M 3/5175* (2013.01); *G06F 40/205* (2020.01); *G10L 17/04* (2013.01);
(Continued)

(58) Field of Classification Search
CPC . H04M 3/5175; H04M 2203/40; G10L 17/04; G10L 25/51; G10L 25/63; G10L 25/87
(Continued)

(56) References Cited

U.S. PATENT DOCUMENTS 6,151,576 A  11/2000  Warnock et al.
6,275,806 B1  8/2001  Pertrushin
(Continued)

OTHER PUBLICATIONS

Hiabibi, Maryann, et ., "Keyword Extraction and Clustering for Document Recommendation in Conversations," IEEE, ;2013); retrieved from the Internet at http://publicationsidiap.ch/downloads/papers/2016/-labibi_IEEEACMTASLP_2014; 14 pages.
(Continued)

*Primary Examiner* — Thjuan K Addy
(74) *Attorney, Agent, or Firm* — Armstrong Teasdale LLP

(57) ABSTRACT

A computer-implemented method for providing an objective evaluation to a customer service representative regarding his performance during an interaction with a customer may include receiving a digitized data stream corresponding to a spoken conversation between a customer and a representative; converting the data stream to a text stream; generating a representative transcript that includes the words from the text stream that are spoken by the representative; comparing the representative transcript with a plurality of positive words and a plurality of negative words; and generating a score that varies according to the occurrence of each word spoken by the representative that matches one of the positive words, and/or the occurrence of each word spoken by the representative that matches one of the negative words. Tone of voice, as well as response time, during the interaction may also be monitored and analyzed to adjust the score, or generate a separate score.

20 Claims, 4 Drawing Sheets

Related U.S. Application Data continuation of application No. 16/880,325, filed on May 21, 2020, now Pat. No. 11,140,267, which is a continuation of application No. 16/513,942, filed on Jul. 17, 2019, now Pat. No. 10,708,425, which is a continuation of application No. 16/150,699, filed on Oct. 3, 2018, now Pat. No. 10,404,859, which is a continuation of application No. 15/823,850, filed on Nov. 28, 2017, now Pat. No. 10,122,855, which is a continuation of application No. 15/409,188, filed on Jan. 18, 2017, now Pat. No. 9,871,918, which is a continuation of application No. 15/091,121, filed on Apr. 5, 2016, now Pat. No. 9,596,349.

(60) Provisional application No. 62/186,145, filed on Jun. 29, 2015.

(51) Int. Cl.
*G10L 15/26* (2006.01)
*G10L 17/04* (2013.01)
*G10L 17/08* (2013.01)
*G10L 25/51* (2013.01)
*G10L 25/63* (2013.01)
*G10L 25/87* (2013.01)
*H04M 3/42* (2006.01)

(52) U.S. Cl.
CPC .............. *G10L 17/08* (2013.01); *G10L 25/51* (2013.01); *G10L 25/63* (2013.01); *H04M 3/42* (2013.01); *G10L 15/26* (2013.01); *G10L 25/87* (2013.01); *H04M 2201/40* (2013.01); *H04M 2201/41* (2013.01); *H04M 2203/40* (2013.01); *H04M 2203/401* (2013.01)

(58) Field of Classification Search
USPC ............ 379/265.07, 265.06, 265.01, 265.03, 379/265.05, 265.02
See application file for complete search history.

(56) References Cited

U.S. PATENT DOCUMENTS

| | | |
|---|---|---|
| 6,445,775 B1 | 9/2002 | Morganstein et al. |
| 6,678,694 B1 | 1/2004 | Zimmermann et al. |
| 7,058,565 B2 | 6/2006 | Gusler et al. |
| 7,133,828 B2 | 11/2006 | Scarano et al. |
| 7,263,489 B2 | 8/2007 | Cohen et al. |
| 7,487,094 B1 | 2/2009 | Konig et al. |
| 7,602,900 B1 | 10/2009 | Croak et al. |
| 7,672,845 B2 | 3/2010 | Beranek et al. |
| 7,728,870 B2 | 6/2010 | Rudnik et al. |
| 7,761,321 B2 | 7/2010 | Kannan et al. |
| 7,844,466 B2 | 11/2010 | Roy |
| 7,940,897 B2 | 5/2011 | Khor et al. |
| 8,010,391 B2 | 8/2011 | Wait et al. |
| 8,108,237 B2 | 1/2012 | Bourne et al. |
| 8,204,884 B2 | 6/2012 | Freedman et al. |
| 8,224,840 B2 | 7/2012 | Bao et al. |
| 8,447,678 B1 | 5/2013 | Baublit |
| 8,589,343 B2 | 11/2013 | Solin |
| 8,687,792 B2 | 4/2014 | Yacoub et al. |
| 8,713,117 B2 | 4/2014 | Downes et al. |
| 8,775,514 B2 | 7/2014 | Goel et al. |
| 8,811,593 B1 | 8/2014 | Morrissey |
| 8,837,687 B2 | 9/2014 | Odinak et al. |
| 8,892,419 B2 | 11/2014 | Lundberg et al. |
| 8,971,217 B2 | 3/2015 | Smith, Jr. et al. |
| 8,990,105 B1 | 3/2015 | Shatkin-Margolis et al. |
| 9,025,551 B2 | 5/2015 | Kim et al. |
| 9,026,551 B2 | 5/2015 | Drennan, III |
| 9,118,751 B2 | 8/2015 | Kolbegger et al. |
| 9,160,852 B2 | 10/2015 | Ripa et al. |
| 9,225,833 B1 | 12/2015 | Koster et al. |
| 9,240,013 B2 | 1/2016 | Khor et al. |
| 9,386,152 B2 | 7/2016 | Riahi et al. |
| 9,392,117 B2 | 7/2016 | Milstein et al. |
| 9,412,130 B2 | 8/2016 | Wasserman et al. |
| 9,413,891 B2 | 8/2016 | Dwyer et al. |
| 9,460,722 B2 | 10/2016 | Sidi et al. |
| 9,521,258 B2 | 12/2016 | Ripa et al. |
| 9,536,266 B2 | 1/2017 | Ploesser et al. |
| 9,548,979 B1 | 1/2017 | Johnson et al. |
| 9,596,349 B1 | 3/2017 | Hernandez |
| 9,635,178 B2 | 4/2017 | Raanani et al. |
| 9,661,067 B2 | 5/2017 | Seth et al. |
| 9,799,035 B2 | 10/2017 | Cama et al. |
| 9,871,918 B1 | 1/2018 | Hernandez |
| 10,079,937 B2 | 9/2018 | Nowak et al. |
| 10,122,855 B1 | 11/2018 | Hernandez |
| 10,147,427 B1 | 12/2018 | Johnson et al. |
| 10,275,522 B1 | 4/2019 | Hernandez |
| 10,404,859 B1 | 9/2019 | Hernandez |
| 10,417,643 B2 | 9/2019 | Sri et al. |
| 10,708,425 B1 | 7/2020 | Hernandez |
| 11,140,267 B1 | 10/2021 | Hernandez |
| 2002/0035474 A1 | 3/2002 | Alpdemir |
| 2002/0067821 A1 | 6/2002 | Benson et al. |
| 2003/0002653 A1 | 1/2003 | Uckun |
| 2003/0078766 A1 | 4/2003 | Appelt et al. |
| 2003/0125958 A1 | 7/2003 | Alpdemir et al. |
| 2004/0008828 A1 | 1/2004 | Coles et al. |
| 2005/0238161 A1 | 10/2005 | Yacoub et al. |
| 2006/0015335 A1 | 1/2006 | Vennelakanti et al. |
| 2006/0109975 A1 | 5/2006 | Judkins et al. |
| 2006/0140389 A1 | 6/2006 | Stuart et al. |
| 2006/0173859 A1 | 8/2006 | Kim et al. |
| 2006/0289622 A1 | 12/2006 | Khor et al. |
| 2007/0033005 A1 | 2/2007 | Cristo et al. |
| 2007/0036289 A1 | 2/2007 | Fu et al. |
| 2007/0121811 A1 | 5/2007 | Ying et al. |
| 2007/0121893 A1 | 5/2007 | Khouri et al. |
| 2007/0195944 A1 | 8/2007 | Korenblit et al. |
| 2008/0235018 A1 | 9/2008 | Eggen et al. |
| 2008/0260122 A1 | 10/2008 | Conway et al. |
| 2009/0248415 A1 | 10/2009 | Jablokov et al. |
| 2009/0248671 A1 | 10/2009 | Maruyama et al. |
| 2009/0327263 A1 | 12/2009 | Maghoul |
| 2010/0086108 A1 | 4/2010 | Jaiswal et al. |
| 2011/0106534 A1 | 5/2011 | Lebeau et al. |
| 2011/0145214 A1 | 6/2011 | Zhang et al. |
| 2011/0191106 A1 | 8/2011 | Khor et al. |
| 2011/0307277 A1 | 12/2011 | Cruz et al. |
| 2012/0177196 A1 | 7/2012 | Geva et al. |
| 2012/0197644 A1 | 8/2012 | Nagano et al. |
| 2013/0030807 A1 | 1/2013 | Burns et al. |
| 2013/0051544 A1 | 2/2013 | Ross et al. |
| 2013/0051547 A1 | 2/2013 | Chavez |
| 2013/0142332 A1* | 6/2013 | Ramos ................ G06Q 30/01 380/236 |
| 2013/0266127 A1 | 10/2013 | Schachter et al. |
| 2013/0290214 A1 | 10/2013 | Clavin |
| 2013/0290343 A1 | 10/2013 | Kruglick |
| 2013/0301815 A1 | 11/2013 | Berger et al. |
| 2013/0315385 A1 | 11/2013 | Zhao et al. |
| 2014/0067375 A1 | 3/2014 | Wooters |
| 2014/0093056 A1 | 4/2014 | Kawashima et al. |
| 2014/0140496 A1 | 5/2014 | Ripa et al. |
| 2014/0140497 A1 | 5/2014 | Ripa et al. |
| 2014/0143026 A1* | 5/2014 | Nies ................ G06Q 10/06398 705/7.42 |
| 2014/0172740 A1 | 6/2014 | McCormick et al. |
| 2014/0220526 A1 | 8/2014 | Sylves |
| 2014/0226807 A1 | 8/2014 | Pickford |
| 2014/0280621 A1 | 9/2014 | Bourdaillet et al. |
| 2014/0316997 A1 | 10/2014 | Van Buskirk et al. |
| 2014/0324424 A1 | 10/2014 | Kim |
| 2014/0324481 A1 | 10/2014 | Schoos et al. |
| 2015/0032639 A1 | 1/2015 | Cherifi |
| 2015/0039308 A1 | 2/2015 | Kim et al. |
| 2015/0142704 A1 | 5/2015 | London |
| 2015/0195406 A1 | 7/2015 | Dwyer et al. |

(56) References Cited

U.S. PATENT DOCUMENTS

| | | |
|---|---|---|
| 2015/0256675 A1 | 9/2015 | Sri et al. |
| 2015/0317641 A1 | 11/2015 | Khor et al. |
| 2015/0348048 A1 | 12/2015 | Kurian |
| 2016/0098663 A1 | 4/2016 | Skiba et al. |
| 2016/0125484 A1 | 5/2016 | Hanson et al. |
| 2017/0078490 A1 | 3/2017 | Kaminsky et al. |

OTHER PUBLICATIONS

Fernandez, Santiago, et ., "An application of recurrent neur networks to discriminative keyword spotting," ntemation Conference on Artifici Neur, Networks, (date unknown), retrieved from the Internet at https:// -nediatum.ulitum.de/doc/1289941/file.pdf; 10 pages.

Bae, Sung Min, et ., "A web-based system for anyzing the voices of cl center customers in the service industry," Elsevier Expert Systems with Applications 28 (2005) 29-41, retrieved from the Internet at https://cmapspublic3.ihmc. is/rid=1MT7F5224-XVH7BJ-1535/Bae%2005%2OESwAJ%20webbased% 20system%20for%20anyzing%20the%20voices%20of%20cl%20center%20customer.pdf; 13 pages.

Ezzat, Souraya, et ., "Sentiment Anysis of CI Centre Audio Conversations using Text Classification," ntemation Journ of Computer Information Systems and Industri Management Applications, ISSN 2150-7988 vol. 4 (2012), retrieved from the Internet at http://www.mirlabs.net/ijcisim/regular_papers_2012/Paper68.pdf; 9 pages.

Gupta, Pumima, et ., "Two-Stream Emotion Recognition For CI Center Monitoring," Interspeech 2007, August 27-31, Antwerp, Belgium, retrieved from the Internet at http://citeseerx.ist.psu.edu/viewdoc/download?Joi=10.1.1.348.4882&rep=rep1&type=pdf; 4 pages.

Pallotta, Vincenzo, et ., "Interaction Mining: The New Frontier of Customer Interaction Anytics," Studies in Somputation Intelligence—Jan. 2013, retrieved from the Internet at https://www.researchgate.net/profile/Vincenzo_Plottafpublication/289733213_Interaction_Mining_The_New_Frontier of Customer_Interaction_Anytics/inks/5735a9d308ae9ace840ac79c.pdf. Publication date via https://link.springer.com/thapter/10.1007/978-3-642-31546-6 6; 22 pages.

Weng, Chao, et ., "Discriminative Training Using Non-uniform Criteria for Keyword Spotting on Spontaneous Speech," IEEE/ACM Transactions on Audio, Speech, and Language Processing 23, No. 2, retrieved from the Internet at https://sites.google.com/site/cweng6/files-1/manuscript.pdf; 4 pages.

Y. Yang and L. Li, "The Design and Implementation of a Smart e-Receptionist," in IEEE Potentis, vol. 32, No. 4, pp. 22-27, doi: 10.1109/MPOT.2012.2213851., Jul. 22, 2013.

Z. Kacic, "Advances in spoken diogue systems development," ISIE '99. Proceedings of the IEEE Internation Symposium on Indtri Electronics (Cat. No.99TH8465), Bled, Slovenia, pp. 169-172 vol. 1, doi: 10.1109/ISIE.1999.801778, Jul. 1999.

\* cited by examiner

VOICE AND SPEECH RECOGNITION FOR CALL CENTER FEEDBACK AND QUALITY ASSURANCE

RELATED APPLICATIONS

The current patent application is a continuation of, and claims the benefit of, U.S. patent application Ser. No. 16/150,699, filed Oct. 3, 2018 and entitled "VOICE AND SPEECH RECOGNITION FOR CALL CENTER FEEDBACK AND QUALITY ASSURANCE," which is a continuation of U.S. patent application Ser. No. 15/823,850, entitled "VOICE AND SPEECH RECOGNITION FOR CALL CENTER FEEDBACK AND QUALITY ASSURANCE," filed Nov. 28, 2017 (now U.S. Pat. No. 10,122,855), which is a continuation patent application which claims priority benefit with regard to all common subject matter to U.S. patent application Ser. No. 15/409,188, entitled "VOICE AND SPEECH RECOGNITION FOR CALL CENTER FEEDBACK AND QUALITY ASSURANCE," filed Jan. 18, 2017, now U.S. Pat. No. 9,871,918, which claims priority benefit with regard to all common subject matter to U.S. patent application Ser. No. 15/091,121, now U.S. Pat. No. 9,596,349, entitled "VOICE AND SPEECH RECOGNITION FOR CALL CENTER FEEDBACK AND QUALITY ASSURANCE," filed Apr. 5, 2016 which claims priority benefit with regard to all common subject matter to U.S. Provisional Application Ser. No. 62/186,145, entitled "VOICE AND SPEECH RECOGNITION FOR CALL CENTER FEEDBACK AND QUALITY ASSURANCE," filed Jun. 29, 2015. The listed, earlier-filed applications are hereby incorporated by reference in their entireties into the current patent application.

FIELD OF THE INVENTION

The present disclosure generally relates to computing devices, software applications, and methods that utilize voice and speech recognition to provide feedback to a customer service representative regarding his performance during an interaction with a customer.

BACKGROUND

Recorded phone conversations between a customer calling a call center and a customer service representative are often utilized to evaluate the performance of the representative. A supervisor of the representative or manager may listen to at least a portion of one or more conversations in order to check for behavior that needs improvement, such as interrupting the customer, using improper language, using an inappropriate tone of voice, or the like. The supervisor may also listen for following proper protocols, positive interactions with customers, and behavior that should be rewarded and reinforced. However, in many cases, long periods of time may go by between the recorded conversations and the opportunity for the supervisor to listen to them. During this time, bad behavior of the representative may go uncorrected while positive actions may be unrecognized, leading to development of habits that are difficult to change.

BRIEF SUMMARY

Embodiments of the present technology relate to computing devices, software applications, computer-implemented methods, and computer-readable media for providing an evaluation to a customer service representative regarding his performance during an interaction with a customer. The embodiments may provide for receiving a data stream corresponding to a spoken conversation between a customer and a representative, generating a representative transcript from the conversation, comparing the representative transcript to a list of positive words and negative words, determining tone of voice characteristics from the representative and the customer, determining a response time between when the customer stops speaking and the representative starts speaking, and/or generating one or more scores that vary according to the representative's word usage, tone of voice, and response time.

In a first aspect, a computer-implemented method for providing an evaluation to a customer service representative regarding his performance during an interaction with a customer may be provided. The method may include: (1) receiving a digitized data stream corresponding to a spoken conversation between a customer and a representative; (2) converting the data stream to a text stream; (3) generating a representative transcript that includes the words from the text stream that are spoken by the representative; (4) comparing the representative transcript with a plurality of positive words and a plurality of negative words; and/or (5) generating a score that varies according to the occurrence of each word spoken by the representative that matches one of the positive words and the occurrence of each word spoken by the representative that matches one of the negative words to facilitate an objective evaluation of a customer interaction. The method may include additional, fewer, or alternative actions, including those discussed elsewhere herein, and/or may be implemented via one or more processors and/or via computer-executable instructions stored on non-transitory computer-readable medium or media.

In another aspect, a computing device for providing an evaluation to a customer service representative regarding his performance during an interaction with a customer may be provided. The computing device may include a memory element and a processing element. The processing element may be electronically coupled to the memory element. The processing element may be configured to receive a digitized data stream corresponding to a spoken conversation between a customer and a representative, convert the data stream to a text stream, generate a representative transcript that includes the words from the text stream that are spoken by the representative, compare the representative transcript with a plurality of positive words and a plurality of negative words, and/or generate a score that varies according to the occurrence of each word spoken by the representative that matches one of the positive words and the occurrence of each word spoken by the representative that matches one of the negative words to facilitate an objective evaluation of a customer interaction. The computing device may include additional, fewer, or alternate components and/or functionality, including those discussed elsewhere herein.

In yet another aspect, a software application for providing an evaluation to a customer service representative regarding his performance during an interaction with a customer may be provided. The software application may comprise a speech recognition component, a transcript comparison component, and a score generator. The speech recognition component may receive a digitized data stream corresponding to a spoken conversation between a customer and a representative. The speech recognition component may be configured to convert the data stream to a text stream and generate a representative transcript that includes the words from the text stream that are spoken by the representative. The transcript comparison component may receive the representative transcript. The transcript comparison component may be configured to compare the representative transcript with a plurality of positive words and a plurality of negative words, determine a positive count corresponding to a number of occurrences when the words of the representative transcript match one or more positive words, and/or determine a negative count corresponding to a number of occurrences when the words of the representative transcript match one or more negative words. The score generator may receive the positive count and the negative count. The score generator may be configured to generate a score which varies based upon the positive count and the negative count to facilitate an objective evaluation of a customer interaction. The software application may include additional, less, or alternate functionality, including that discussed elsewhere herein.

In yet another aspect, a computer-readable medium for providing an evaluation to a customer service representative regarding his performance during an interaction with a customer may be provided. The computer-readable medium may include an executable program stored thereon, wherein the program instructs a processing element of a computing device to perform the following steps: (1) receiving a digitized data stream corresponding to a spoken conversation between a customer and a representative; (2) converting the data stream to a text stream; (3) generating a representative transcript that includes the words from the text stream that are spoken by the representative; (4) comparing the representative transcript with a plurality of positive words and a plurality of negative words; and/or (5) generating a score that varies according to the occurrence of each word spoken by the representative that matches one of the positive words and the occurrence of each word spoken by the representative that matches one of the negative words to facilitate an objective evaluation of a customer interaction. The program stored on the computer-readable medium may instruct the processing element to perform additional, fewer, or alternative actions, including those discussed elsewhere herein.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of computing devices, software applications, and computer-implemented methods disclosed therein. It should be understood that each Figure depicts an embodiment of a particular aspect of the disclosed computing devices, software applications, and computer-implemented methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

Figure 1:
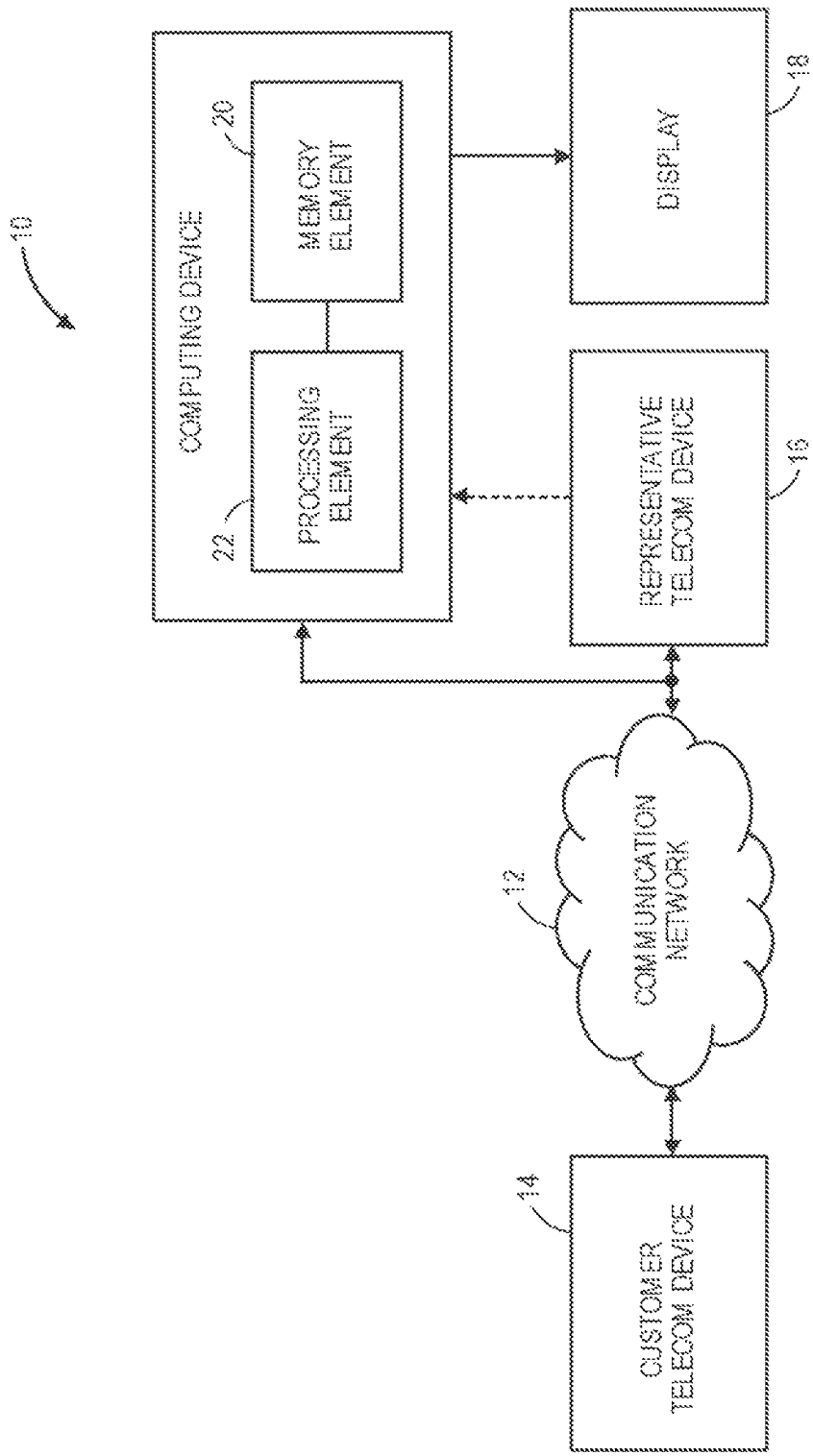
FIG. 1 illustrates an exemplary environment, shown in block schematic form, in which various components of a computing device may be utilized, the computing device configured to provide an evaluation to a customer service representative regarding his performance during an interaction with a customer.

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments described in this patent application and other possible embodiments may relate to, inter alia, computing devices, software applications, methods, and media for providing an evaluation to a customer service representative regarding his performance during an interaction with a customer. The computing device, through hardware operation, execution of the software application, implementation of the method, or combinations thereof, may be utilized as follows. An existing customer, or a potential customer, may call a business seeking information regarding one or more products or services offered by the business, seeking to discuss a bill or an account, seeking to change services or return a product, or the like. The representative may answer the call with a telecom device, such as a telephone including a headset or a handset. The representative may have a conversation with the customer to provide information or resolve the customer's issue. The computing device may also receive the call either through a communication line, such as a phone line, or through a connection with the telecom device.

The computing device may have already been trained to recognize or identify the representative's voice. While the customer and the representative are talking, the computing device may be tracking, or continuously determining, which voice is that of the representative. The computing device may also determine the voice which is not recognized, or already known, is that of the customer. The computing device may also perform speech recognition, converting the dialog between the customer and the representative to text. The computing device may identify words of the text that are spoken by the representative and may compare the words with a list of positive words or phrases and a list of negative words or phrases. The positive words or phrases may include language that is preferred for interacting with customers, such as correct grammar, common courtesies, and proper etiquette. The negative words or phrases may include language that is considered to be incorrect grammar, slang, or obscenities. The computing device may generate a first score for the representative's customer service performance. The first score may vary according to the usage of positive words and negative words by the representative. For example, the first score may increase when the representative uses positive words or phrases. Likewise, the first score may decrease when the representative uses negative words or phases.

In addition, the computing device may analyze the conversation to determine a tone of voice for the representative and to determine a tone of voice for the customer. The tone of voice of the representative and the customer may refer to the frequency or spectral content of each one's voice. The tone of voice may also refer to the amplitude or volume of each voice. The tone of voice for the representative and the customer may be determined and recorded during the entire conversation. Thus, the responses of the representative to the customer can be determined. In other words, it may be determined whether the representative changed his tone of voice in response to a change in tone of voice of the customer. The computing device may generate a second score that varies according to the responses of the representative to the customer. For example, the second score may increase for every time that the customer changed his tone of voice and the representative did not. Likewise, the second score may decrease for every time that the representative changed his tone of voice in response to a change in tone of voice of the customer. The second score may be combined with the first score, such as by addition of the two scores or averaging of the two scores.

Furthermore, the computing device may determine when a change of speakers occurs during the conversation—that is when the customer stops talking and the representative starts talking. The computing device may further determine a response time which is related to the period of time that elapses between when the customer stops talking and the representative starts talking. The computing device may generate a third score that varies according to the response time. For example, there may be a window of time, say between a lower threshold of 1 second and an upper threshold of 5 seconds, during which it is considered polite for the representative to respond to the customer. If the response time is less than the lower threshold or the representative and the customer are speaking simultaneously, then the representative may be interrupting the customer. If the response time is greater than the upper threshold, then the representative may be considered to be keeping the customer waiting. In an exemplary implementation, the third score may not change as long the response time is within the window. But, the third score may decrease for every occurrence when the response time is less than the lower threshold or greater than the upper threshold. The third score may be combined with the first and second scores, such as by addition of the three scores or averaging of the three scores.

After the phone call between the representative and the customer is over, the computing device may present the representative with a total score that represents the combination of the three individual scores. In addition or instead, the computing device may present the representative with the three individual scores. Furthermore, the computing device may present the representative with a summary of the evaluation. The summary may include a list of both the positive words or phrases, and the negative words and phrases, used by the representative. The summary may also include a list of occurrences when the representative changed his tone of voice, and the times during the conversation when they occurred. The summary may further include a list of occurrences when the representative did not respond to the customer during the window of time for a proper response, and the times during the conversation when they occurred. The evaluation may further include suggestions for improvement or behavioral changes, if needed.

Specific embodiments of the technology will now be described in connection with the attached drawing figures. The embodiments are intended to describe aspects of the invention in sufficient detail to enable those skilled in the art to practice the invention. Other embodiments can be utilized and changes may be made without departing from the scope of the present invention. The following detailed description is, therefore, not to be taken in a limiting sense. The scope of the present invention is defined only by the appended claims, along with the full scope of equivalents to which such claims are entitled.

Exemplary Computing Device

FIG. 1 depicts an exemplary environment in which embodiments of a computing device 10 may be utilized. The environment may include a communication network 12, a customer telecom device 14, a representative telecom device 16, and/or a display 18. The computing device 10 may broadly comprise a memory element 20 and a processing element 22 capable of executing a software application 24. The computing device 10 may provide an evaluation to a customer service representative regarding his performance during an interaction with a customer. Examples of the computing device 10 may include a workstation computer, a desktop computer, a laptop computer, a palmtop computer, a tablet computer, a smart phone, other type of mobile device, wearable electronics, smart watch, or the like. In various embodiments, the computing device 10 and the representative telecom device 16 may be integrated with one another.

The communication network 12 generally allows communication between the customer telecom device 14 and the representative telecom device 16. The communication network 12 may include local area networks, metro area networks, wide area networks, cloud networks, the Internet, cellular networks, plain old telephone service (POTS) networks, and the like, or combinations thereof. The communication network 12 may be wired, wireless, or combinations thereof and may include components such as modems, gateways, switches, routers, hubs, access points, repeaters, towers, and the like. The telecom devices 14, 16 may connect to the communication network 12 either through wires, such as electrical cables or fiber optic cables, or wirelessly, such as RF communication using wireless standards such as cellular 2G, 3G, or 4G, Institute of Electrical and Electronics Engineers (IEEE) 802.11 standards such as WiFi, IEEE 802.16 standards such as WiMAX, Bluetooth™, or combinations thereof.

The customer telecom device 14 generally allows the customer to communicate with the representative of the business. The customer telecom device 14 may be embodied by a cell phone, a mobile phone, a smart phone, a landline, or any phone or electronic device capable of sending and receiving voice communication through the communication network 12. The customer telecom device 14 may include electronic circuitry to send and receive voice communication either wirelessly or through wires or cables. The customer telecom device 14 may further include user interface components such as a keypad, a speaker and a microphone incorporated in a headset or handset, and the like. The customer may utilize the customer telecom device 14 in a conventional manner.

The representative telecom device 16 generally allows the representative to communicate with the customer. The representative telecom device 16 may be typically embodied by a landline type of phone including a base station and a headset with a microphone and a speaker, although other types of phones, such as a smart phone, may be utilized. The representative telecom device 16 may function in a substantially similar fashion to the customer telecom device 14 such that the representative telecom device 16 may communicate with the customer telecom device 14 through the communication network 12 to allow the representative to have a conversation with the customer.

The display 18 generally presents information to the representative. The display 18 may include video devices of the following types: plasma, light-emitting diode (LED), organic LED (OLED), Light Emitting Polymer (LEP) or Polymer LED (PLED), liquid crystal display (LCD), thin film transistor (TFT) LCD, LED side-lit or back-lit LCD, heads-up displays (HUDs), or the like, or combinations thereof. The display 18 may include a screen on which the information is presented, with the screen possessing a square or a rectangular aspect ratio that may be viewed in either a landscape or a portrait mode. In various embodiments, the display 18 may also include a touch screen occupying the entire screen or a portion thereof so that the display 18 functions as part of a user interface. In some embodiments, the display 18 may be housed in a monitor housing or the like. In other embodiments, the display 18 may be integrated with the computing device 10.

The memory element 20 may include data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 20 may be embedded in, or packaged in the same package as, the processing element 22. The memory element 20 may include, or may constitute, a "computer-readable medium." The memory element 20 may store the instructions, code, code segments, software, firmware, programs, applications, apps, services, daemons, or the like, including the software application 24, that are executed by the processing element 22.

The processing element 22 may include processors, microprocessors (single-core and multi-core), microcontrollers, digital signal processors (DSPs), field-programmable gate arrays (FPGAs), analog and/or digital application-specific integrated circuits (ASICs), or the like, or combinations thereof. The processing element 22 may generally execute, process, or run instructions, code, code segments, software, firmware, programs, applications, apps, processes, services, daemons, or the like. The processing element 22 may also include hardware components such as finite-state machines, sequential and combinational logic, and other electronic circuits that may perform the functions necessary for the operation of the current invention. The processing element 22 may further include, or be in electronic communication with, circuitry to decode or convert wireless signals, as well as sampling circuits, analog to digital converters (ADCs), filtering circuits, amplifier circuits, and the like. The processing element 22 may be in communication with the other electronic components through serial or parallel links that include address buses, data buses, control lines, and the like.

By executing the software application 24 or through the use of specially-configured hardware, the processing element 22 may perform the following tasks. Before the computing device 10 is utilized during a phone call, the processing element 22 may be trained to recognize or identify the representative's voice. The training process may involve having the representative utilize the representative telecom device 16 as a microphone into which the representative speaks. The representative telecom device 16 may communicate an audio signal to the computing device 10. The audio signal may be digitized and optionally filtered to eliminate noise and frequencies outside of the typical human vocal range by the representative telecom device 16 and/or the computing device 10 to create a data signal received by the processing element 22. Alternatively, the representative may utilize a standalone microphone electrically connected to the computing device 10, a microphone from a headset electrically connected to the computing device 10, or a microphone integrated with the computing device 10 to generate the audio signal. The representative may speak a plurality of words or phrases or a series of sounds which are analyzed by the processing element 22 to create a voice print, template, or model that is stored in the memory element 20. The processing element 22 may generate a spectrogram or utilize short-time Fourier transform to create the voice print. The voice print may be used to identify the representative.

During the phone call between the customer and the representative, the processing element 22 may receive an audio stream corresponding to the spoken conversation from either the communication network 12 or the representative telecom device 16. The audio stream may be digitized and filtered, in a similar fashion as mentioned above, to create a data stream. The processing element 22 may implement speech recognition or may convert speech to text utilizing techniques such as hidden Markov models, dynamic time warping, neural networking, or the like, or combinations thereof. The output of the speech recognition may be a stream of text words. In various embodiments, the processing element 22 may also successively or repeatedly generate a spectrogram or utilize short-time Fourier transform to create a plurality of voice prints, each voice print representing a short period of time, such as 0.5-1 seconds. The processing element 22 may further compare each voice print with the voice print of the representative in order to identify the voice of the current speaker during the conversation on an ongoing basis or as a function of time. Those voice prints that match the voice print of the representative may be marked or noted as the voice of the representative. Those voice prints that do not match the voice print of the representative may be marked or noted as the voice of the customer. The processing element 22 may also timestamp the text so that each word is associated with a time of the conversation. The processing element 22 may match each word of the conversation with one or more voice prints so that it may determine which person spoke each word. Thus, the processing element 22 may generate a representative transcript of the conversation which includes those words of the text that are spoken by the representative. The processing element 22 may also generate a customer transcript including words of the text that are spoken by the customer.

The processing element 22 may compare the representative transcript in an ongoing process throughout the conversation with a list of positive words or phrases and a list of negative words or phrases. The positive words or phrases may include language that is preferred for interacting with customers, such as correct grammar, common courtesies, and/or proper etiquette. The negative words or phrases may include language that is considered to be incorrect grammar, slang, and/or obscenities.

The processing element 22 may generate a first score for the representative's customer service performance. The first score may vary according to the usage of positive words and negative words by the representative. For example, the first score may have an initial value, such as 0 or 100. The processing element 22 may increase the first score during the conversation when the representative uses positive words or phrases. Likewise, the processing element 22 may decrease the first score when the representative uses negative words or phrases. The processing element 22 may also store in the memory element 20 all of the positive words used by the representative and the number of occurrences of each usage, as well as the negative words used by the representative and the number of occurrences of each usage. In some embodiments, the processing element 22 may mark the positive words and negative words in the representative transcript which is stored in the memory element 20. As an alternative scoring method, the processing element 22 may count the total number of positive words and negative words and adjust the first score accordingly at the end of the phone conversation.

The processing element 22 may also analyze the conversation to determine a tone of voice for the representative and to determine a tone of voice for the customer. The tone of voice of the representative and the customer may refer to the frequency or spectral content of each one's voice. The tone of voice may also refer to the amplitude or volume of each voice. Thus, the processing element 22 may perform mathematical or signal processing operations such as Fourier transforms, pulse coding, and the like in order to determine variations in the frequency, the amplitude, or both of each voice. The processing element 22 may repeatedly generate voice prints and compare them with already stored voice prints, as discussed above, to identify the voice of the representative and the voice of the customer. The processing element 22 may further utilize the identities of the voice prints to determine the tone of voice for the representative and the tone of voice for the customer on an ongoing basis for the entire conversation. The tone of voice of each person may be recorded in the memory element 20 as one or more values representing the tone of voice for each of a plurality of timestamps. The tone of voice may be recorded at a given rate, such as 1-10 samples per second. Thus, the memory element 20 may include a first series of tone of voice values for the representative and a second series of tone of voice values for the customer. The processing element 22 may also determine a first average tone of voice value for the representative and a second average tone of voice value for the customer. In addition, the processing element 22 may match, or otherwise associate, the tone of voice of the representative with the words spoken by the representative. For example, each word of the conversation spoken by the representative may be associated with an average, or maximum, tone of voice value that was recorded for the particular word of the conversation. The processing element 22 may perform the same operation for the tone of voice of the customer.

During the conversation, the customer may speak for a turn and then the representative may speak for a turn. The representative may respond to a question from the customer or may make a statement following a statement from the customer. Each turn may correspond to a set of timestamp values and the associated tone of voice values for the speaker during the turn. The processing element 22 may determine whether the customer changed his tone of voice during his turn and whether the representative changed his tone of voice in response. In various embodiments, the processing element 22 may determine each occurrence when the customer's tone of voice value is above a first threshold, such as 10% greater than his average tone of voice value. The processing element 22 may further determine whether the tone of voice value for the representative increases above a second threshold, such as a 10% increase greater than his average tone of voice value, within a first time period afterward, such as 10 seconds.

The processing element 22 may generate a second score for the representative's customer service performance. The second score may vary according to whether the representative changed his tone of voice in response to a change in tone of voice of the customer. For example, like the first score, the second score may have an initial value, such as 0 or 100. The processing element 22 may increase the second score during the conversation when the representative does not change his tone of voice in response to a change in tone of voice of the customer. This may indicate that the representative has remained calm during a tense or confrontational moment of the conversation. Likewise, the processing element 22 may decrease the second score during the conversation when the representative changes his tone of voice in response to a change in tone of voice of the customer—perhaps indicating that the representative was unable to remain calm when the customer got agitated.

The processing element 22 may determine when a change of speakers occurs during the conversation—that is when the customer stops talking and the representative starts talking. The processing element 22 may repeatedly generate voice prints and compare them with already stored voice prints, as discussed above, to identify the voice of the representative and the voice of the customer. The processing element 22 may further determine a response time which is related to the period of time that elapses between when the customer stops talking and the representative starts talking. In certain embodiments, the processing element 22 may start a timer at the end of every word spoken by the customer. The timer may stop when the next word is spoken. If the next word is spoken by the representative, then the processing element 22 may record the value of the timer—which would correspond to the response time. In some cases, the processing element 22 may determine that the representative and the customer are speaking at the same time.

The processing element 22 may generate a third score that varies according to the response time. For example, like the first and second scores, the third score may have an initial value, such as 100. In various embodiments, there may be a window of time, say between a lower threshold of 1 second and an upper threshold of 5 seconds, during which it is considered polite for the representative to respond to the customer. If the response time is less than the lower threshold or the representative and the customer are speaking simultaneously, then the representative may be interrupting the customer. If the response time is greater than the upper threshold, then the representative may be considered to be keeping the customer waiting. The processing element 22 may record all of the occurrences when the response time was outside of the window and the times during the conversation when they occurred. In an exemplary implementation, the third score may not change as long the response time is within the window. But, the processing element 22 may decrease the third score for every occurrence when the response time is less than the lower threshold, or greater than the upper threshold.

After the conversation has concluded, the processing element 22 may generate a total score, which may be a combination of the first, second, and third scores, such as the sum of the three or the average of the three. In addition or instead, the processing element 22 may present the representative with the three individual scores. Furthermore, the processing element 22 may present the representative with the evaluation. The evaluation may include a list of both the positive words or phrases and the negative words and phrases used by the representative. The evaluation may also include a list of occurrences when the representative changed his tone of voice and the times during the conversation when they occurred. The evaluation may further include a list of occurrences when the representative did not respond to the customer during the window of time for a proper response, and the times during the conversation when they occurred. The evaluation may additionally include suggestions for improvement or behavioral changes, if needed.

The computing device 10 may be electrically connected to the communication network 12 and to the display 18, with an optional connection to the representative telecom device 16, as shown in FIG. 1. During the conversation between the representative and the customer, the computing device 10 may receive the audio stream from the communication network 12 or alternatively from the representative telecom device 16. The processing element 22 may perform the operations necessary to evaluate the representative's customer service performance, as discussed above. After the conversation is over, the computing device 10 may communicate the total score or the first, second, and third scores along with the summary of the evaluation to the display 18 so that the representative can review the evaluation. Given the immediate feedback that the current invention provides, the representative may start addressing the areas that need improvement before his next phone call. Furthermore, the scores and all of the data recorded during the conversation may be transferred from the memory element 20 of the computing device 10 to a data server that is accessible by the supervisor or manager of the representative.

Exemplary Computer-Implemented Method

Figure 2A:
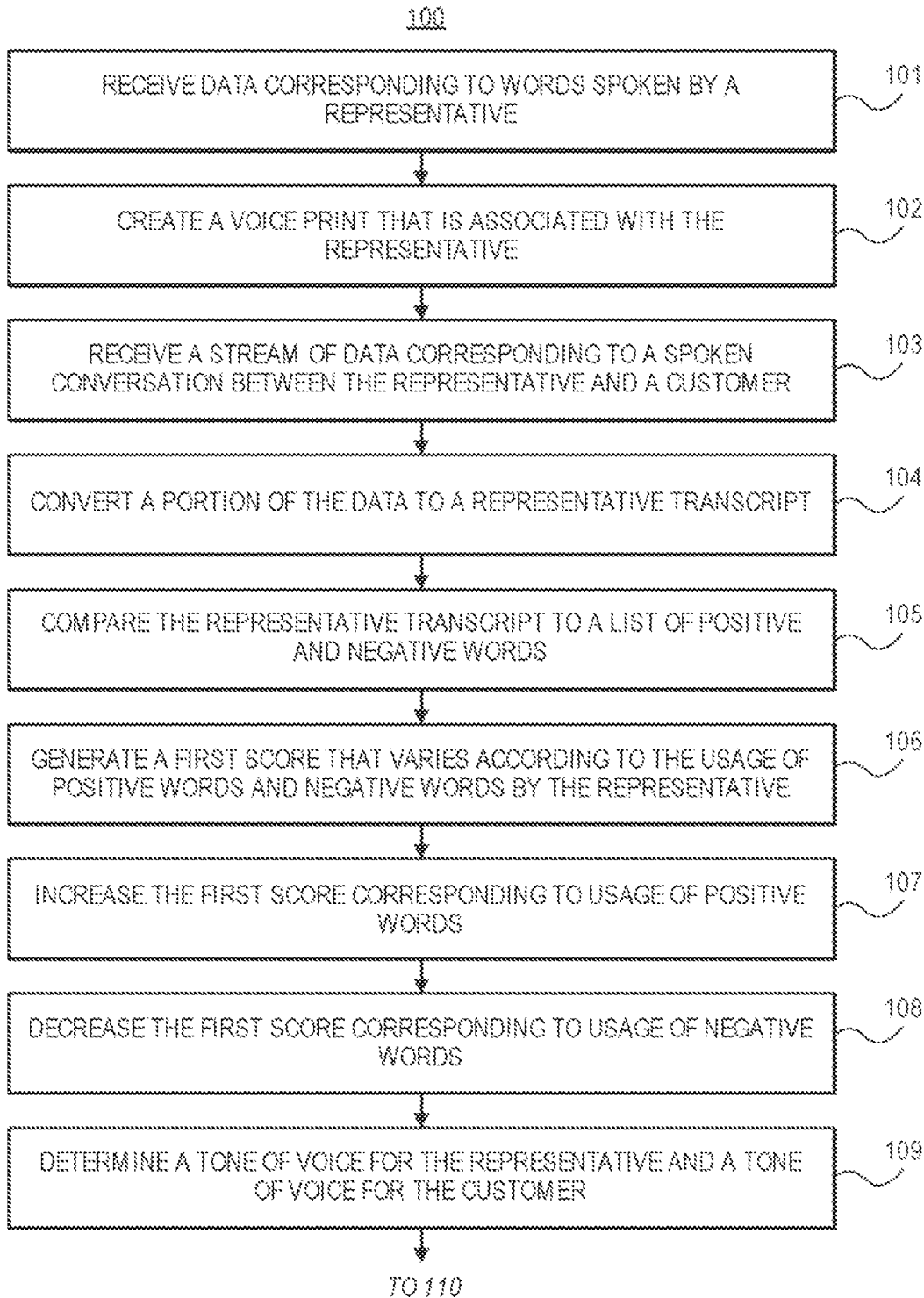
FIGS. 2A and 2B illustrate at least a portion of the steps of an exemplary computer-implemented method for providing an evaluation to a customer service representative regarding his performance during an interaction with a customer.
Figure 2B:
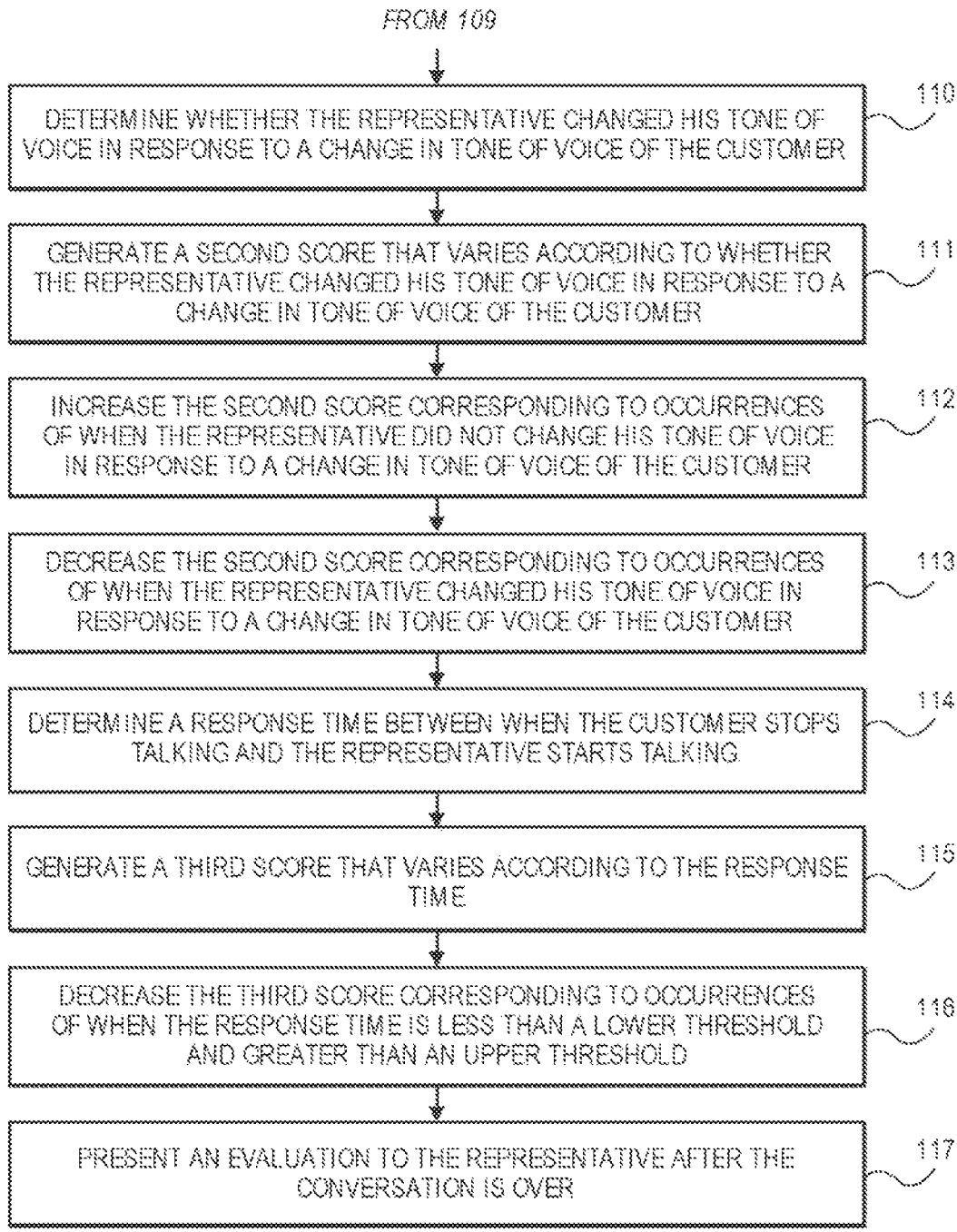

FIGS. 2A and 2B depict a listing of steps of an exemplary computer-implemented method 100 for providing an evaluation to a customer service representative regarding his performance during an interaction with a customer. The steps may be performed in the order shown in FIGS. 2A and 2B, or they may be performed in a different order. Furthermore, some steps may be performed concurrently as opposed to sequentially. In addition, some steps may be optional. The steps of the computer-implemented method 100 may be performed by the computing device 10 through the utilization of hardware, software, firmware, or combinations thereof.

Referring to step 101, data corresponding to words spoken by a representative is received. The representative may utilize the representative telecom device 16 as a microphone into which the representative speaks. The representative telecom device 16 may communicate an audio signal to the computing device 10. The audio signal may be digitized and optionally filtered to eliminate noise and frequencies outside of the typical human vocal range by the representative telecom device 16 and/or the computing device 10 to create a data signal received by the processing element 22.

Referring to step 102, a voice print that is associated with the representative may be created. The words, phrases, or sounds spoken by the representative may be analyzed by the processing element 22 to create a voice print, template, or model that is stored in the memory element 20. The processing element 22 may generate a spectrogram or utilize short-time Fourier transform to create the voice print.

Referring to step 103, a stream of data corresponding to a spoken conversation between a representative and a customer may be received. The stream of data may be received from the communication network 12 or the representative telecom device 16 as an audio stream which is then digitized and filtered.

Referring to step 104, a portion of the data may be converted to a representative transcript. The processing element 22 may implement speech recognition or may convert speech to text utilizing techniques such as hidden Markov models, dynamic time warping, neural networking, or the like, or combinations thereof. The output of the speech recognition may be a stream of text words. In various embodiments, the processing element 22 may also successively or repeatedly generate a spectrogram or utilize a short-time Fourier transform to create a plurality of voice prints, each voice print representing a short period of time, such as 0.5-1 seconds. The processing element 22 may further compare each voice print with the voice print of the representative in order to identify the voice of the current speaker during the conversation on an ongoing basis or as a function of time. Those voice prints that match the voice print of the representative may be marked or noted as the voice of the representative. Those voice prints that do not match the voice print of the representative may be marked or noted as the voice of the customer. The processing element 22 may also timestamp the text so that each word is associated with a time of the conversation. The processing element 22 may match each word of the conversation with one or more voice prints so that it may determine which person spoke each word. Thus, the processing element 22 may generate the representative transcript of the conversation. The processing element 22 may also generate a customer transcript.

Referring to step 105, the representative transcript may be compared to a list of positive words or phrases and a list of negative words or phrases. The positive words or phrases may include language that is preferred for interacting with customers, such as correct grammar, common courtesies, and proper etiquette. The negative words or phrases may include language that is considered to be incorrect grammar, slang, and/or obscenities. The comparison of the representative transcript to the list of positive words and negative words may be performed as an ongoing process throughout the conversation.

Referring to steps 106-108, a first score that varies according to the usage of positive words and negative words by the representative may be generated. For example, the first score may have an initial value, such as 0 or 100. The processing element 22 may increase the first score during the conversation when the representative uses positive words or phrases. Likewise, the processing element 22 may decrease the first score when the representative uses negative words or phases. The processing element 22 may also store in the memory element 20 all of the positive words used by the representative and the number of occurrences of each usage as well as the negative words used by the representative and the number of occurrences of each usage. In some embodiments, the processing element 22 may mark the positive words and negative words in the representative transcript which is stored in the memory element 20. As an alternative scoring method, the processing element 22 may count the total number of positive words and negative words, and adjust the first score accordingly at the end of the phone conversation.

Referring to step 109, a tone of voice for the representative and a tone of voice for the customer may be determined. The tone of voice of the representative and the customer may refer to the frequency or spectral content of each one's voice. The tone of voice may also refer to the amplitude or volume of each voice. Thus, the processing element 22 may perform mathematical or signal processing operations such as Fourier transforms, pulse coding, and the like in order to determine variations in the frequency, the amplitude, or both of each voice. The processing element 22 may repeatedly generate voice prints and compare them with already stored voice prints, as discussed above, to identify the voice of the representative and the voice of the customer. The processing element 22 may further utilize the identities of the voice prints to determine the tone of voice for the representative and the tone of voice for the customer on an ongoing basis for the entire conversation. The tone of voice of each person may be recorded in the memory element 20 as one or more values representing the tone of voice for each of a plurality of timestamps. The tone of voice may be recorded at a given rate, such as 1-10 samples per second. Thus, the memory element 20 may include a first series of tone of voice values for the representative and a second series of tone of voice values for the customer. The processing element 22 may also determine a first average tone of voice value for the representative and a second average tone of voice value for the customer.

Referring to step 110, whether the representative changed his tone of voice in response to a change in tone of voice of the customer may be determined. During the conversation, the customer may speak for a turn and then the representative may speak for a turn. The representative may respond to a question from the customer or may make a statement following a statement from the customer. The processing element 22 may determine whether the customer changed his tone of voice during his turn and whether the representative changed his tone of voice in response. In various embodiments, the processing element 22 may determine each occurrence when the customer's tone of voice value is above a first threshold, such as 10% greater than his average tone of voice value. The processing element 22 may further determine whether the tone of voice value for the representative increases above a second threshold, such as a 10% increase greater than his average tone of voice value, within a first time period afterward, such as 10 seconds.

Referring to steps 111-113, a second score that varies according to whether the representative changed his tone of voice in response to a change in tone of voice of the customer may be generated or calculated. For example, the second score may have an initial value, such as 0 or 100. The processing element 22 may increase the second score during the conversation when the representative does not change his tone of voice in response to a change in tone of voice of the customer. This may indicate that the representative has remained calm during a tense or confrontational moment of the conversation. Likewise, the processing element 22 may decrease the second score during the conversation when the representative changes his tone of voice in response to a change in tone of voice of the customer—perhaps indicating that the representative was unable to remain calm when the customer got agitated.

Referring to step 114, a response time between when the customer stops talking and the representative starts talking may be determined or calculated. The processing element 22 may repeatedly generate voice prints and compare them with already stored voice prints, as discussed above, to identify the voice of the representative and the voice of the customer. The processing element 22 may also assume that the voice which does not match a voice print is the customer's. The processing element 22 may further determine a response time which is related to the period of time that elapses between when the customer stops talking and the representative starts talking. In certain embodiments, the processing element 22 may start a timer at the end of every word spoken by the customer. The timer may stop when the next word is spoken. If the next word is spoken by the representative, then the processing element 22 may record the value of the timer—which would correspond to the response time. In some cases, the processing element 22 may determine that the representative and the customer are speaking at the same time.

Referring to steps 115 and 116, a third score that varies according to the response time may be generated or calculated. For example, the third score may have an initial value, such as 100. In various embodiments, there may be a window of time, say between a lower threshold of 1 second and an upper threshold of 5 seconds, during which it is considered polite for the representative to respond to the customer. If the response time is less than the lower threshold or the representative and the customer are speaking simultaneously, then the representative may be interrupting the customer. If the response time is greater than the upper threshold, then the representative may be considered to be keeping the customer waiting. The processing element 22 may record all of the occurrences when the response time was outside of the window and the times during the conversation when they occurred. In an exemplary implementation, the third score may not change as long the response time is within the window. But, the processing element 22 may decrease the third score for every occurrence when the response time is less than the lower threshold or greater than the upper threshold.

Referring to step 117, an evaluation may be presented to the representative after the conversation is over. The processing element 22 may generate a total score, which may be a combination of the first, second, and third scores, such as the sum of the three or the average of the three that are communicated to the display 18. In addition or instead, the computing device 10 may present the representative with the three individual scores. Furthermore, the computing device 10 may communicate the evaluation to the display 18. The evaluation may include a list of both the positive words or phrases and the negative words and phrases used by the representative. The evaluation may also include a list of occurrences when the representative changed his tone of voice and the times during the conversation when they occurred. The evaluation may further include a list of occurrences when the representative did not respond to the customer during the window of time for a proper response and the times during the conversation when they occurred. The evaluation may additionally include suggestions for improvement or behavioral changes, if needed.

Exemplary Software Application

Figure 3:
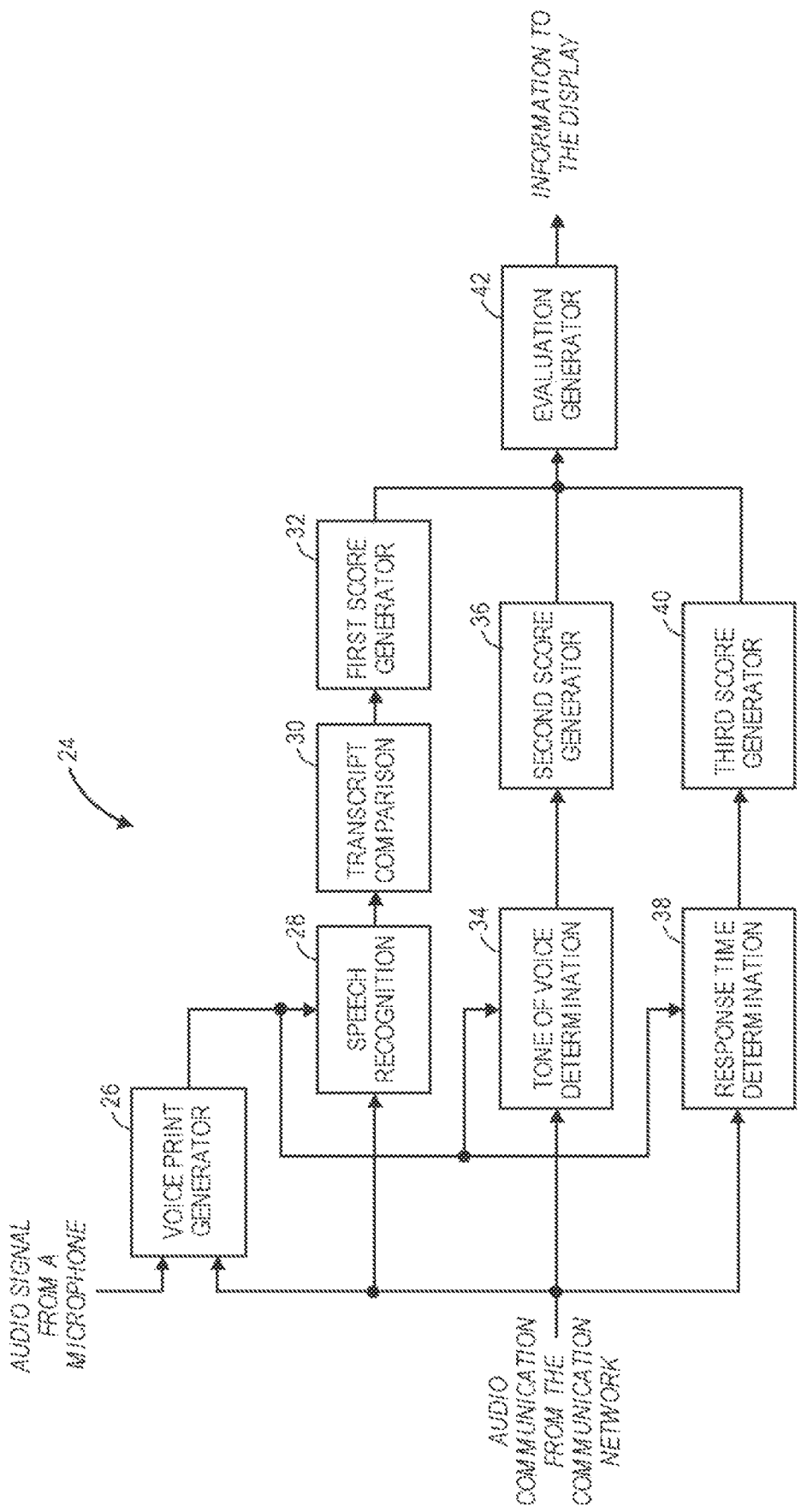
FIG. 3 illustrates various components of an exemplary software application shown in block schematic form, the software application configured to provide an evaluation to a customer service representative regarding his performance during an interaction with a customer.

FIG. 3 illustrates at least a portion of the components of an exemplary software application 24 for providing an evaluation to a customer service representative regarding his performance during an interaction with a customer. The software application 24 may be implemented during a phone call between the customer and the representative. The software application 24 may be generally executed by the computing device 10 and may broadly comprise a voice print generator 26, a speech recognition component 28, a transcript comparison component 30, a first score generator 32, a tone of voice determination component 34, a second score generator 36, a response time determination component 38, a third score generator 40, and/or an evaluation generator 42.

The voice print generator 26 may receive audio communication from a microphone to which the representative has access or from the communication network 12. The audio communication may include an electronic signal that is digitized and filtered to create a data stream which corresponds to speech from the representative. The representative may speak a plurality of words or phrases or a series of sounds which are analyzed by the voice print generator 26 to create a voice print, template, and/or model that is stored in the memory element 20 and accessed by the software application 24. The voice print generator 26 may generate a spectrogram or utilize the short-time Fourier transform to create the voice print. The voice print may be used to identify the representative.

In various embodiments, during the conversation, the voice print generator 26 may also successively or repeatedly generate a spectrogram or utilize the short-time Fourier transform to create a plurality of voice prints, each voice print derived from a period of time, such as 0.5-1 seconds. The voice print generator 26 may compare the successively-generated voice prints with the voice print of the representative to identify the voice of the current speaker during the conversation on an ongoing basis or as a function of time. Those voice prints that match the voice print of the representative may be associated with, identified, marked, or noted in the memory element 20 as the voice of the representative. Those voice prints that do not match the voice print of the representative may be associated with, identified, marked, or noted in the memory element 20 as the voice of the customer. Alternatively, the voice print generator 26 may communicate the voice prints to the other components of the software application 24 to perform the comparison and identification.

The speech recognition component 28 may receive audio communication from the communication network 12. The audio communication may include an electronic signal that is digitized and filtered to create a data stream which corresponds to the conversation between the representative and the customer. The speech recognition component 28 may utilize techniques such as hidden Markov models, dynamic time warping, neural networking, or the like, or combinations thereof in order to convert the data stream to text. The speech recognition component 28 may receive or access the identified voice prints generated by the voice print generator 26. The speech recognition component 28 may also timestamp the text so that each word is associated with a time of the conversation. The speech recognition component 28 may match each word of the conversation with one or more identified voice prints so that it may determine which person spoke each word. Thus, the speech recognition component 28 may generate a representative transcript of the conversation which includes those words of the text that are spoken by the representative. The speech recognition component 28 may also generate a customer transcript including words of the text that are spoken by the customer.

The transcript comparison component 30 may compare the representative transcript in an ongoing process throughout the conversation with a list of positive words or phrases and a list of negative words or phrases. The positive words or phrases may include language that is preferred for interacting with customers, such as correct grammar, common courtesies, and/or proper etiquette. The negative words or phrases may include language that is considered to be incorrect grammar, slang, and/or obscenities. The transcript comparison component 30 may determine a positive count corresponding to a number of occurrences or instances when the words of the representative transcript match one or more positive words. The transcript comparison component 30 may also determine a negative count corresponding to a number of occurrences or instances when the words of the representative transcript match one or more negative words. The transcript comparison component 30 may also store in the memory element 20 all of the positive words used by the representative and the number of occurrences of each usage, as well as the negative words used by the representative, and the number of occurrences of each usage. Alternatively, the transcript comparison component 30 may mark the positive words and negative words in the representative transcript which is stored in the memory element 20.

The first score generator 32 may generate a first score which varies according to the usage of positive words and negative words by the representative. For example, the first score may have an initial value, such as 0 or 100. The first score generator 32 may increase the first score based upon the positive count from the transcript comparison component 30. Likewise, the first score generator 32 may decrease the first score based upon the negative count from the transcript comparison component 30.

The tone of voice determination component 34 may determine a tone of voice for the representative and determine a tone of voice for the customer. The tone of voice of the representative and the customer may refer to the frequency or spectral content of each one's voice. The tone of voice may also refer to the amplitude or volume of each voice. Thus, the tone of voice determination component 34 may perform mathematical or signal processing operations such as Fourier transforms, pulse coding, and the like in order to determine variations in the frequency, the amplitude, or both of each voice. The tone of voice determination component 34 may receive or access the identified voice prints generated by the voice print generator 26. The tone of voice determination component 34 may further utilize the identified voice prints to determine the tone of voice for the representative and the tone of voice for the customer on an ongoing basis for the entire conversation. The tone of voice of each person may be recorded in the memory element 20 as one or more values representing the tone of voice for each of a plurality of timestamps. The tone of voice may be recorded at a given rate, such as 10 samples per second. Thus, the memory element 20 may include a first series of tone of voice values for the representative and a second series of tone of voice values for the customer. The tone of voice determination component 34 may also determine a first average tone of voice value for the representative and a second average tone of voice value for the customer. In addition, the tone of voice determination component 34 may match, or otherwise associate, the tone of voice of the representative with the words spoken by the representative. For example, each word of the conversation spoken by the representative may be associated with an average, or maximum, tone of voice value that was recorded for the particular word of the conversation. The tone of voice determination component 34 may perform the same operation for the tone of voice of the customer.

In various embodiments, the tone of voice determination component 34 may determine each occurrence when the customer's tone of voice value is above a first threshold, such as 10% greater than his average tone of voice value. The tone of voice determination component 34 may further determine, for each occurrence, whether the tone of voice value for the representative increases above a second threshold, such as a 10% increase greater than his average tone of voice value, within a first time period afterward, such as 10 seconds.

The second score generator 36 may generate a second score which varies according to whether the representative changed his tone of voice in response to a change in tone of voice of the customer. For example, the second score may have an initial value, such as 0 or 100. The second score generator 36 may increase the second score during the conversation when the representative does not change his tone of voice in response to a change in tone of voice of the customer. This may indicate that the representative has remained calm during a tense or confrontational moment of the conversation. Likewise, the second score generator 36 may decrease the second score during the conversation when the representative changes his tone of voice in response to a change in tone of voice of the customer—perhaps indicating that the representative was unable to remain calm when the customer got agitated.

The response time determination component 38 may determine a response time which is related to the period of time that elapses between when the customer stops talking and the representative starts talking. During the conversation, the response time determination component 38 may receive or access the identified voice prints generated by the voice print generator 26. The response time determination component 38 may utilize the identified voice prints to determine when the representative is speaking and when the customer is speaking. In certain embodiments, the response time determination component 38 may start a timer at the end of every word spoken by the customer. The timer may stop when the next word is spoken. If the next word is spoken by the representative, then the response time determination component 38 may record the value of the timer— which corresponds to the response time. In some cases, the response time determination component 38 may determine that the representative and the customer are speaking at the same time.

The third score generator 40 may generate a third score that varies according to the response time. For example, the third score may have an initial value, such as 100. In various embodiments, there may be a window of time, say between a lower threshold of 1 second and an upper threshold of 5 seconds, during which it is considered polite for the representative to respond to the customer. If the response time is less than the lower threshold or the representative and the customer are speaking simultaneously, then the representative may be interrupting the customer. If the response time is greater than the upper threshold, then the representative may be considered to be keeping the customer waiting. The third score generator 40 may record all of the occurrences when the response time was outside of the window and the times during the conversation when they occurred. In an exemplary implementation, the third score may not change as long as the response time is within the window. But, the third score generator 40 may decrease the third score for every occurrence when the response time is less than the lower threshold or greater than the upper threshold.

The evaluation generator 42 may generate an evaluation of the representative's performance after the conversation has ended. The evaluation generator 42 may generate a total score, which may be a combination of the first, second, and third scores, such as the sum of the three or the average of the three that are communicated to the display 18. In addition or instead, the evaluation generator 42 may present the representative with the three individual scores. Furthermore, the evaluation generator 42 may communicate the evaluation to the display 18. The evaluation may include a list of both the positive words or phrases and the negative words and phrases used by the representative. The evaluation may also include a list of occurrences when the representative changed his tone of voice and the times during the conversation when they occurred. The evaluation may further include a list of occurrences when the representative did not respond to the customer during the window of time for a proper response and the times during the conversation when they occurred. The evaluation may additionally include suggestions for improvement or behavioral changes, if needed.

Exemplary Computer-Implemented Method for Providing an Evaluation to a Customer Service Representative Regarding his Performance During an Interaction with a Customer In a first aspect, a computer-implemented method for providing an evaluation to a customer service representative regarding his performance during an interaction with a customer may be provided. The method may include, via one or more processors: (1) receiving a digitized data stream corresponding to a spoken conversation between a customer and a representative; (2) converting the data stream to a text stream; (3) generating a representative transcript that includes the words from the text stream that are spoken by the representative; (4) comparing the representative transcript with a plurality of positive words and a plurality of negative words; and/or (5) generating a score that varies according to the occurrence of each word spoken by the representative that matches one of the positive words and the occurrence of each word spoken by the representative that matches one of the negative words. The method may include additional, fewer, or alternative actions, including those discussed elsewhere herein.

For instance, the method may include, via one or more processors: increasing the score corresponding to usage of positive words; decreasing the score corresponding to usage of negative words; generating a plurality of voice prints, each voice print derived from one of a plurality of periods of time during the conversation; comparing each voice print with a voice print of the representative to determine an identity of the voice print; indicating a first set of voice prints that are associated with the representative and a second set of voice prints that are associated with the customer; matching the first set of voice prints with words from the text stream that are spoken by the representative; and/or presenting the score, a list of words from the representative transcript that match one or more positive words, and a list of words from the representative transcript that match one or more negative words on a display.

Exemplary Network Computing Device for Providing an Evaluation to a Customer Service Representative Regarding his Performance During an Interaction with a Customer In another aspect, a computing device for providing an evaluation to a customer service representative regarding his performance during an interaction with a customer may be provided. The computing device may include a memory element and a processing element. The processing element may be electronically coupled to the memory element. The processing element may be configured to receive a digitized data stream corresponding to a spoken conversation between a customer and a representative; convert the data stream to a text stream; generate a representative transcript that includes the words from the text stream that are spoken by the representative; compare the representative transcript with a plurality of positive words and a plurality of negative words; and/or generate a score that varies according to the occurrence of each word spoken by the representative that matches one of the positive words and the occurrence of each word spoken by the representative that matches one of the negative words. The computing device may include additional, fewer, or alternate components and/or functionality, including that discussed elsewhere herein.

For instance, the processing element may be further configured to: increase the score corresponding to usage of positive words; decrease the score corresponding to usage of negative words; generate a plurality of voice prints, each voice print derived from one of a plurality of periods of time during the conversation; compare each voice print with a voice print of the representative to determine an identity of the voice print; indicate a first set of voice prints that are associated with the representative and a second set of voice prints that are associated with the customer; match the first set of voice prints with words from the text stream that are spoken by the representative; and/or present the score, a list of words from the representative transcript that match one or more positive word, and a list of words from the representative transcript that match one or more negative word on a display.

Exemplary Software Application for Providing an Evaluation to a Customer Service Representative Regarding his Performance During an Interaction with a Customer In yet another aspect, a software application for providing an evaluation to a customer service representative regarding his performance during an interaction with a customer may be provided. The software application may comprise a speech recognition component, a transcript comparison component, and/or a score generator. The speech recognition component may receive a digitized data stream corresponding to a spoken conversation between a customer and a representative. The speech recognition component may be configured to convert the data stream to a text stream and generate a representative transcript that includes the words from the text stream that are spoken by the representative. The transcript comparison component may receive the representative transcript. The transcript comparison component may be configured to compare the representative transcript with a plurality of positive words and a plurality of negative words; determine a positive count corresponding to a number of occurrences when the words of the representative transcript match one or more positive words; and/or determine a negative count corresponding to a number of occurrences when the words of the representative transcript match one or more negative words. The score generator may receive the positive count and the negative count. The score generator may be configured to generate a score which varies based upon the positive count and the negative count. The software application may include additional, less, or alternate functionality, including that discussed elsewhere herein.

For instance, the software application may further comprise a voice print generator which receives the digitized data stream and may be configured to generate a plurality of voice prints, each voice print derived from one of a plurality of periods of time during the conversation, compare each voice print with a voice print of the representative to determine an identity of the voice print; associate the voice prints that match the voice print of the representative with the voice of the representative; and/or associate the voice prints that do not match the voice print of the representative with the voice of the customer. The software application may additionally comprise an evaluation generator which receives the score and is configured to present the score, a list of words from the representative transcript that match one or more positive words, and/or a list of words from the representative transcript that match one or more negative words on a display. In addition, the score generator may be further configured to increase the score corresponding to the positive count and decrease the score corresponding to the negative count. The components may be computer-readable or computer-executable instructions, computer applications, and/or computer-executable instruction modules stored on non-transitory computer-readable media or medium.

Exemplary Computer-Readable Medium for Providing an Evaluation to a Customer Service Representative Regarding his Performance During an Interaction with a Customer In yet another aspect, a computer-readable medium for providing an evaluation to a customer service representative regarding his performance during an interaction with a customer may be provided. The computer-readable medium may include an executable program stored thereon, wherein the program instructs a processing element of a computing device to perform the following steps: (1) receiving a digitized data stream corresponding to a spoken conversation between a customer and a representative; (2) converting the data stream to a text stream; (3) generating a representative transcript that includes the words from the text stream that are spoken by the representative; (4) comparing the representative transcript with a plurality of positive words and a plurality of negative words; and/or (5) generating a score that varies according to the occurrence of each word spoken by the representative that matches one of the positive words and the occurrence of each word spoken by the representative that matches one of the negative words. The program stored on the computer-readable medium may instruct the processing element to perform additional, fewer, or alternative actions, including those discussed elsewhere herein.

For instance, the program may instruct the processing element to: increase the score corresponding to usage of positive words; decrease the score corresponding to usage of negative words; generate a plurality of voice prints, each voice print derived from one of a plurality of periods of time during the conversation; compare each voice print with a voice print of the representative to determine an identity of the voice print; indicate a first set of voice prints that are associated with the representative and a second set of voice prints that are associated with the customer; match the first set of voice prints with words from the text stream that are spoken by the representative; and/or present the score, a list of words from the representative transcript that match one or more positive words, and a list of words from the representative transcript that match one or more negative words on a display.

Exemplary Feedback & Quality Assurance

A tool or computer system may be configured to provide for an objective and/or more accurate review of customer-call center representative telephone calls. The tool or computer system may provide (1) immediate associate feedback enabled by voice recognition software; (2) quality assurance processes that include new, more comprehensive call data; and/or (3) systematic messaging to reinforce desired behaviors, based upon vocal metrics.

Voice recognition technology may be used to gather an increased amount of data, looking for particular words and tones of voice that are assumed to be representative of exemplary associate behaviors. Certain words or phrases may be considered to be particularly appropriate (for example, drawing from a library of common courtesies, or from desired word tracks for certain transactions). Certain words or phrases may also be considered particularly inappropriate. Certain etiquette protocols may also be detected (for example, whether an associate interrupts a customer). The tone of voice may be detected (for both associates and customers).

All of these factors may then be correlated to a scoring—with certain words, phrases, points of etiquette considered to be particularly positive or negative. In the aggregate, this scoring could be used to provide general feedback regarding the assumed quality of individual calls and groups of calls (either for individual associates, or sets of associates). The specifically detected words, phrases, and points of etiquette may also provide the basis for immediate associate feedback.

For example, at the conclusion of a call, the associate may receive on-screen messaging that reinforces aspects of the conversation that scored well, as well as a suggestion for alternative phrasing when aspects of the conversation scored poorly. Based upon tones of voice detected, the associate may also receive positive feedback about staying calm during a tense call (for example, by evaluating the tone of voice of the customer versus the tone of voice of the associate).

Feedback about a telephone call or text interaction with a customer may be provided to the representative during or after a customer interaction. A pop-up window on a computer display screen may provide short bullets of encouragement, feedback, and/or areas of opportunity for improved customer service.

In one aspect, a computer-implemented method of providing customer service feedback and quality assurance may be provided. The method may include (1) monitoring, via one or more processors, a communication stream (and/or associated voice or text communication data) during a customer interaction between a customer and a representative, the interaction being a telephone call or a texting interaction; (2) analyzing, via the one or more processors, the communication stream to determine (i) a word choice by, and/or (ii) a tone of voice of, the representative during the interaction; (3) generating, via the one or more processors, feedback for the representative regarding the customer interaction based upon the (i) word choice, and/or (ii) tone of voice determined; and/or (4) providing, via the one or more processors, the feedback to the representative during or after the customer interaction, such as displaying bullet points on a computer display screen, to facilitate providing objective feedback to the representative to enhance the quality of future customer experiences.

The computer-implemented method may further include (i) analyzing, via the one or more processors, the communication stream to determine a response time of the representative during the interaction; (ii) generating, via the one or more processors, feedback for the representative based upon the response time; and/or (iii) providing, via the one or more processors, the feedback based upon response time to the representative during or after the customer interaction. The method may include generating, via the one or more processors, one or more scores based upon the word choice, tone of voice, and/or response time analysis or determinations; and/or causing, via the one or more processors, the one or more scores to be displayed on a computer screen during or after a customer interaction for the representative's review to provide objective feedback to the representative and enhance future customer experiences and/or service. Generating, via the one or more processors, feedback for the representative regarding the customer interaction based upon the (i) word choice, and/or (ii) tone of voice determined may include analyzing the communication stream or data to determine certain words, phrases, and/or points of etiquette used by the representative during the customer interaction, and/or comparing the certain words, phrases, and/or points of etiquette determined with words, phrases, and/or points of etiquette stored in a memory unit or data structure to identify positive or negative words, phrases, and/or points of etiquette used by the representative. The method may include additional, less, or alternate actions, including those discussed elsewhere herein, and/or may be implemented via one or more processors and/or via computer-executable instructions stored on a non-transitory computer-readable medium.

In another aspect, a computer-implemented method of providing customer service feedback and quality assurance may be provided. The method may include (1) generating or collecting, via one or more processors, communication data (or communication data stream) during (or associated with) a customer interaction between a customer and a representative, the interaction being a telephone call, or an audible or text conversation; (2) storing, via the one or more processors, the communication data (or communication data stream) in a memory unit; (3) analyzing, via the one or more processors, the communication data (or communication data stream) either in real-time or by accessing the data stored in the memory unit, to determine (i) one or more word choices by, and/or (ii) one or more tones of voice of, the representative during the customer interaction; (4) generating, via the one or more processors, feedback based upon the one or more word choices or tones of voice determined from analysis of the communication data (or communication stream); and/or (5) providing, via the one or more processors, the feedback to the representative during or after the interaction based upon (i) the one or more word choices and/or (ii) one or more tones of voice determined from computer analysis of the communication data (and/or communication stream), such as displaying bullet points on a computer display screen, to facilitate providing objective feedback to the representative to enhance the quality of future customer experiences.

The method may include analyzing the communication data (and/or communication stream), via the one or more processors, to determine one or more response times of the representative during the interaction; generating, via the one or more processors, feedback for the representative based upon the one or more response times; and/or providing, via the one or more processors, the feedback based upon the one or more response times to the representative during or after the customer interaction based upon the response time.

The method may include generating, via the one or more processors, one or more scores based upon the word choice, tone of voice, and/or response time analysis or determinations; and causing, via the one or more processors, the one or more scores to be displayed on a computer screen during or after a customer interaction for representative review to provide objective feedback to the representative and enhance future customer experiences and/or service.

Generating, via the one or more processors, feedback for the representative regarding the customer interaction based upon the (i) word choice, and/or (ii) tone of voice determined may include analyzing the communication data or stream to determine certain words, phrases, and/or points of etiquette used by the representative during the customer interaction, and/or comparing the certain words, phrase, and/or points of etiquette determined with pre-determined words, phrases, and/or points of etiquette stored in a memory unit or data structure to identify positive or negative words, phrases, and/or points of etiquette used by the representative. The method may include additional, less, or alternate actions, including those discussed elsewhere herein, and/or may be implemented via one or more processors and/or via computer-executable instructions stored on a non-transitory computer-readable medium.

Exemplary Computer Systems

In one aspect, a computer system configured to provide customer service feedback and quality assurance may be provided. The computer system may include one or more processors configured to: (1) monitor a communication stream (and/or associated data) during a customer interaction between a customer and a representative, the interaction being a telephone call or a texting interaction; (2) analyze the communication stream (and/or associated data) to determine a word choice by, and/or a tone of voice of, the representative during the interaction; (3) generate feedback based upon the word choice and/or tone of voice determined from computer analysis of the communication stream (and/or associated data); and/or (4) provide the feedback based upon the word choice and/or tone of voice to the representative during or after the interaction, such as displaying bullet points on a computer display screen, to facilitate providing objective feedback to the representative to enhance the quality of future customer experiences. The computer system and/or processors may be configured with additional, less, or alternate functionality, including that discussed elsewhere herein.

For instance, the one or more processors may be further configured to: analyze the communication stream to determine one or more response times of the representative during the interaction; and/or provide feedback based upon the one or more response times to the representative during or after the customer interaction. The one or more processors further configured to: generate one or more scores based upon the word choice, tone of voice, or response time analysis or determinations; and/or cause the one or more scores to be displayed on a computer screen during or after a customer interaction for representative review to provide objective feedback to the representative and enhance future customer experiences and/or service.

Generating, via the one or more processors, feedback for the representative regarding the customer interaction based upon the (i) word choice, and/or (ii) tone of voice determined may include analyzing the communication stream or data to determine certain words, phrases, and/or points of etiquette used by the representative during the customer interaction, and/or comparing the certain words, phrases, and/or points of etiquette determined with predetermined words, phrases, and/or points of etiquette stored in a memory unit or data structure to identify positive or negative words, phrases, and/or points of etiquette used by the representative.

In another aspect, a computer system configured to provide customer service feedback and quality assurance may be provided. The computer system may include one or more processors configured to: (1) generate or collect communication data (or communication data stream) during (or associated with) a customer interaction between a customer and a representative, the interaction being a telephone call, or an audible or text conversation; (2) store the communication data (or communication data stream) in a memory unit; (3) analyze the communication data (or communication data stream) either in real-time or by accessing the data stored in the memory unit, to determine (i) one or more word choices by, and/or (ii) one or more tones of voice of, the representative during the customer interaction; (4) generate feedback based upon the one or more word choices or tones of voice determined from analysis of the communication data (or communication stream); and/or (5) provide the feedback to the representative during or after the interaction based upon (i) the one or more word choice and/or (ii) one or more tones of voice determined from computer analysis of the communication data (and/or communication stream), such as displaying bullet points on a computer display screen, to facilitate providing objective feedback to the representative to enhance the quality of future customer experiences. The computer system and/or processor(s) may include additional, less, or alternate functionality or capability, including that discussed elsewhere herein.

For instance, the one or more processors may be configured to: analyze the communication data (and/or communication stream) to determine one or more response times of the representative during the interaction; generate feedback for the representative based upon the one or more response times determined; and/or provide, present, or display the feedback based upon the one or more response times to the representative during or after the customer interaction based upon the response time.

The one or more processors may further be configured to: generate one or more scores based upon the one or more word choices, one or more tones of voice, and/or one or more response times determined; and/or causing, via the one or more processors, the one or more scores to be displayed on a computer screen during or after a customer interaction for representative review to provide objective feedback to the representative and enhance future customer experiences and/or service.

Generating, via the one or more processors, feedback for the representative regarding the customer interaction based upon the (i) one or more word choices, and/or (ii) one or more tones of voice determined may include analyzing the communication data or stream to determine certain words, phrases, and/or points of etiquette used by the representative during the customer interaction, and/or comparing the certain words, phrase, and/or points of etiquette determined with pre-determined words, phrases, and/or points of etiquette stored in a memory unit or data structure to identify positive or negative words, phrases, and/or points of etiquette used by the representative.

ADDITIONAL CONSIDERATIONS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A computer-implemented method for evaluating performance of a call associate during an interaction with an individual, the individual being a customer or a potential customer, the computer-implemented method comprising:

analyzing, via one or more processors using voice recognition, information derived from an electronic representation of an oral conversation involving the call associate and the individual to identify instances of use by the call associate of positive words and instances of use by the call associate of negative words;

generating, via the one or more processors, a first evaluation of the instances of use by the call associate of positive words and a second evaluation of the instances of use by the call associate of negative words; and providing a first visual indicator corresponding to the first evaluation and a second visual indicator corresponding to the second evaluation for display on a device as feedback regarding the performance of the call associate.

2. The computer-implemented method of claim 1, further comprising:

analyzing, via the one or more processors, the information to identify instances of use by the call associate of words designated for a particular transaction;

generating, via the one or more processors, a third evaluation of the instances of use by the call associate of words designated for a particular transaction; and providing a third visual indicator corresponding to the third evaluation for display on the device as feedback regarding the performance of the call associate.

3. The computer-implemented method of claim 1, wherein the first evaluation is a first score and the second evaluation is a second score.

4. The computer-implemented method of claim 1, wherein the first visual indicator and the second visual indicator are provided for display in real-time during the conversation.

5. The computer-implemented method of claim 1, wherein the first visual indicator and the second visual indicator are provided for display after the conclusion of the conversation.

6. The computer-implemented method of claim 1, further comprising providing on-screen messaging for display on a device associated with the call associate to reinforce at least one aspect of the conversation corresponding to a favorable evaluation.

7. The computer-implemented method of claim 1, wherein the first visual indicator is a numeric representation of usage of positive words and the second visual indicator is a numeric representation of usage of negative words.

8. The computer-implemented method of claim 2, wherein the third visual indicator is a numeric representation of usage of designated for a particular transaction.

9. A computing device for evaluating performance of a call associate during an interaction with an individual, the individual being a customer or a potential customer, the computing device comprising:

a processing element; and a memory element including instructions that when executed by the processing element cause the processing element to:

analyze using voice recognition, information derived from an electronic representation of an oral conversation involving the call associate and the individual to identify instances of use by the call associate of positive words and instances of use by the call associate of negative words;

generate a first evaluation of the instances of use by the call associate of positive words and a second evaluation of the instances of use by the call associate of negative words; and provide a first visual indicator corresponding to the first evaluation and a second visual indicator corresponding to the second evaluation for display on a device as feedback regarding the performance of the call associate.

10. The computing device of claim 9, wherein the instructions, when executed by the processing element, further cause the processing element to:

analyze the information to identify instances of use by the call associate of words designated for a particular transaction;

generate a third evaluation of the instances of use by the call associate of words designated for a particular transaction; and provide a third visual indicator corresponding to the third evaluation for display on the device as feedback regarding the performance of the call associate.

11. The computing device of claim 9, wherein the first evaluation is a first score and the second evaluation is a second score.

12. The computing device of claim 9, wherein the first visual indicator and the second visual indicator are provided for display in real-time during the conversation.

13. The computing device of claim 9, wherein the first visual indicator and the second visual indicator are provided for display after the conclusion of the conversation.

14. The computing device of claim 9, wherein the instructions, when executed by the processing element, further cause the processing element to provide on-screen messaging for display on a device associated with the call associate to reinforce at least one aspect of the conversation corresponding to a favorable evaluation.

15. The computing device of claim 9, wherein the first visual indicator is a numeric representation of usage of positive words and the second visual indicator is a numeric representation of usage of negative words.

16. The computing device of claim 10, wherein the third visual indicator is a numeric representation of usage of designated for a particular transaction.

17. A non-transitory computer-readable medium with an executable program stored thereon for evaluating performance of a call associate during an interaction with an individual, the individual being a customer or a potential customer, wherein the program instructs a processing element of a computing device to perform the following:

analyze using voice recognition, information derived from an electronic representation of an oral conversation involving the call associate and the individual to identify instances of use by the call associate of positive words and instances of use by the call associate of negative words;

generate a first evaluation of the instances of use by the call associate of positive words and a second evaluation of the instances of use by the call associate of negative words; and provide a first visual indicator corresponding to the first evaluation and a second visual indicator corresponding to the second evaluation for display on a device as feedback regarding the performance of the call associate.

18. The non-transitory computer-readable medium of claim 17, wherein the program further instructs the processing element to:

analyze the information to identify instances of use by the call associate of words designated for a particular transaction;

generate a third evaluation of the instances of use by the call associate of words designated for a particular transaction; and provide a third visual indicator corresponding to the third evaluation for display on the device as feedback regarding the performance of the call associate.

19. The non-transitory computer-readable medium of claim 17, wherein the first visual indicator and the second visual indicator are provided for display in real-time during the conversation.

20. The non-transitory computer-readable medium of claim 17, wherein the first visual indicator is a numeric representation of usage of positive words and the second visual indicator is a numeric representation of usage of negative words.

\* \* \* \* \*